June 28, 1932.  C. C. FRAISE  1,864,813
TRACTOR CAB
Filed March 10, 1931  2 Sheets-Sheet 1
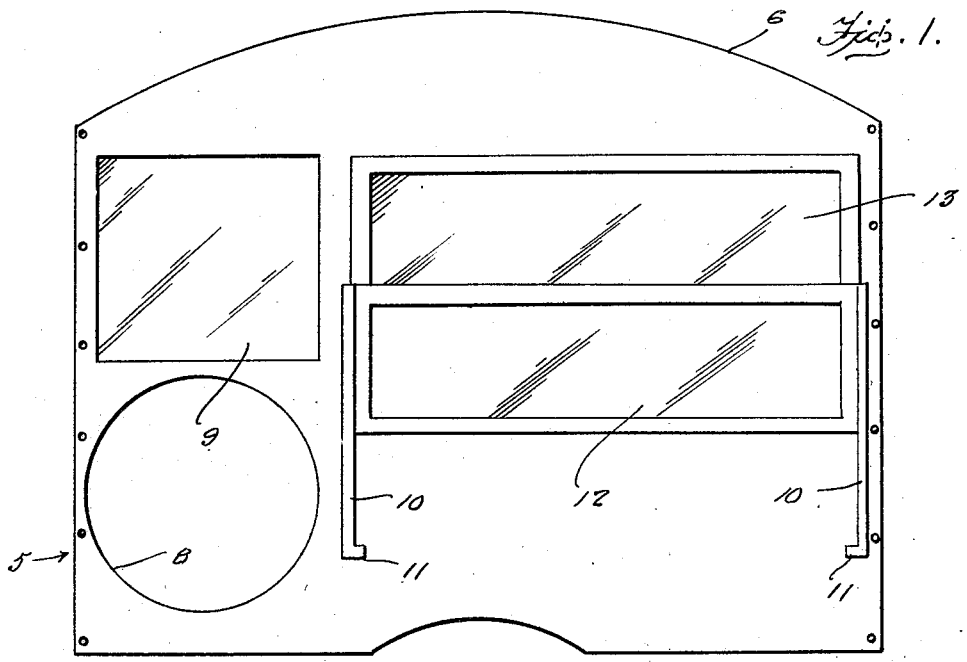
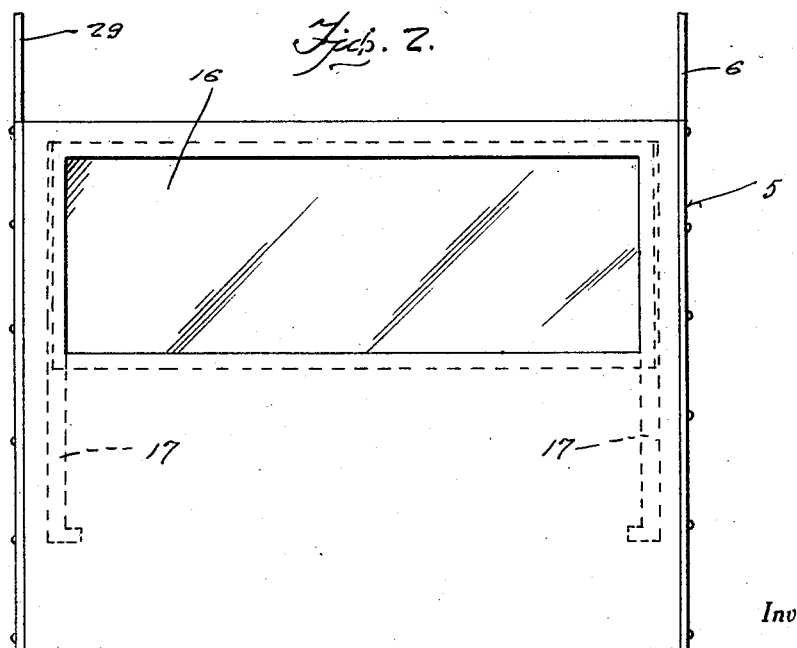
Inventor
C. C. Fraise
By Clarence A. O'Brien
Attorney

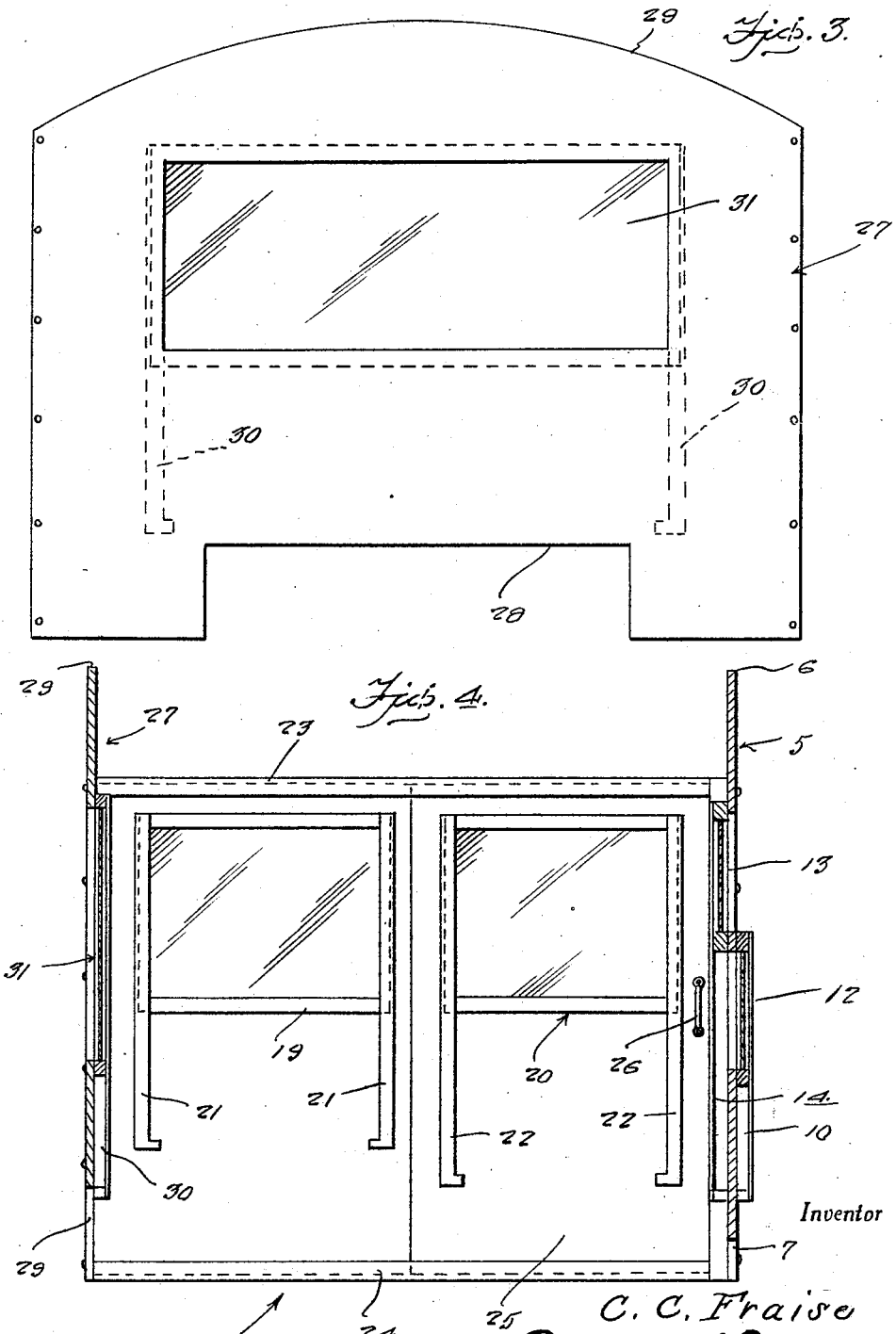

Patented June 28, 1932

1,864,813

UNITED STATES PATENT OFFICE

CHRISTOPHER C. FRAISE, OF ELDORADO SPRINGS, MISSOURI

TRACTOR CAB

Application filed March 10, 1931. Serial No. 521,538.

This invention relates to a sectional enclosure in the form of a cab which is designed to be used in association with the rear seat and canopy equipped portions of a farm tractor.

The particular type of tractor which I have in mind is the kind provided with a roof overlying the operator's seat. At the present time, this canopy structure is of openwork construction and in wind and rain storms, the occupant of the seat is left totally exposed to the detrimental results and effects of the elements.

With the foregoing in mind, I have produced a simple and economical four section structure which, when the sections are joined together, provide a convenient enclosure for the seat and rear fender and chassis construction, these sections being so constructed as to co-operate with the customary existing canopy to provide a substantially storm-proof housing for the occupant of the driver's seat.

Briefly stated, the construction is characterized by front and rear walls joined together by spaced parallel side walls, and all of these walls are provided with windows, some of which are adjustable to increase the effectiveness and efficiency of the structure and to provide for safe vision and driving.

My primary aim is to provide an economical and simple and efficient structure which when assembled will form a practical weather-proof housing and which will accommodate the existing parts without requiring alteration, thereby making the invention desirable for the purposes intended.

These specific details and relative arrangement and association will become more readily apparent from the following description and drawings. In the drawings:

Figure 1 is an elevational view of the front section or wall.

Figure 2 is a side elevational view of the assembled structure.

Figure 3 is a rear elevational view of the rear section or wall.

Figure 4 is a central vertical sectional view through the structure.

In the drawings, in Figure 1, the numeral 5 designates the front section which comprises a sheet metal wall having a curved edge 6 at its top and a notch 7 located centrally at its bottom to accommodate existing details (not shown) on the tractor construction. The numeral 8 merely designates a circular hole located toward one end portion and adapted to accommodate the gasoline or fuel tank (not shown) of the tractor.

Just above this is a stationary window 9. The windshield construction is somewhat in the nature of a double acting sliding sash window. On the exterior I provide suitable channel guides 10 having stops 11 at the bottom to accommodate the sliding sash 12, this being the lower sash. This sash 12 co-operates with the upper sliding sash 13 which is of suitable rectangular construction and slidably mounted in the guide channels 14, as seen better in Figure 4.

In Figure 2, the numeral 15 designates one side wall which has a sliding sash or window 16 mounted in the guides 17. Opposite and parallel to this is the companion side 18 which includes a pair of sliding sashes 19 and 20 mounted in guides 21 and 22 respectively.

I also call attention to this particular sash 18 as it has upper and lower guide channels or runways 23 and 24 which accommodate the sliding door 25 designed to expedite entrance and exit. This front wall 6 is riveted or otherwise fastened to the frontal end portion of the two side walls 15 and 18. Incidently, the sliding door 25 is provided with a handle 26 to facilitate operation thereof.

In Figure 3, I have detailed the rear wall or section, and this is distinguished by the numeral 27 and also comprises a flat sheet metal plate having a notch 28 at its bottom to accommodate existing appurtenances, not shown, on the rear portion of the tractor. Then too, the rear wall has a curvate edge 29 at its top. Moreover, on the interior are perpendicular guides or keepers 30 to accommodate and retain the sliding window 31.

Again, this section 27 is riveted to the rear end portions of the opposed sides 15 and 18, thus making up a box-like housing which constitutes the cab as a unit. In practice, the canopy (not shown) constituting an existing part of the type of tractor on which this device is used, is transversely bowed and it overlies this housing structure and in fact, fits down on the curved edges 6 and 29 of the front and rear sections.

Briefly reviewed, it will be seen that the cab is roofless, so to speak, as it is assembled in Figure 2, but that it co-operates with an existing canopy or roof already on the tractor so that a complete weather proof cab is conveniently formed. Briefly interpreted, this cab may be said to be made up of four distinguishable walls; namely front and rear walls both having window lights and so shaped as to accommodate existing devices on the tractor so as to avoid alteration of these parts.

Then too, the structure includes the spaced parallel side portions having perpendicular keepers for sliding sashes. Moreover, one side, that is, the side 18 is provided with a horizontally sliding door which facilitates entrance and exit. Thus, all told, the parts co-operate in forming a unique, simple and economical structural arrangement to fulfill the requirements of a structure of this class in a highly satisfactory and inexpensive manner.

It is thought that the description taken in connection with the drawings will enable a clear understanding of the invention to be had. Therefore, a more lengthy description is thought unnecessary.

While the preferred embodiment of the invention has been shown and described, it is to be understood that minor changes in shape, size, material, and arrangement of parts, coming within the field of invention claimed may be resorted to in actual practice if desired, without departing from the spirit and scope of the appended claims.

I claim:

1. A cab structure for a canopy equipped tractor, comprising a front wall and a rear wall, and side walls secured to the front wall and rear wall, said front wall and rear wall having their upper part curved to conform with the underside of the canopy of the tractor and their lower part cut away to accommodate the tractor body, a vertically slidable double window in the front wall and at one side, a fixed window in said front wall; a single vertically slidable window in said rear wall and extending substantially thereacross; one of said side walls comprising an upper and a lower channel guide, a pair of cooperating slidable door sections in said guides, a vertically slidable window in each of said door sections; and a single vertically slidable window in the remaining side wall extended substantially the length thereof; said vertically slidable windows comprising each a pair of vertically disposed channel guides, a sash slidable therein; and said double window comprising a pair of double channeled guides on the front wall, a pair of overlapping window sections operable in said double channeled guides.

2. A cab structure for a canopy equipped tractor, comprising a front wall and a rear wall, and side walls secured to the front wall and rear wall, said front wall and rear wall having their upper part curved to conform with the underside of the canopy of the tractor and their lower part cut away to accommodate the tractor body, a vertically slidable double window in the front wall and at one side, a fixed window in said front wall; a single vertically slidable window in said rear wall and extending substantially thereacross; one of said side walls comprising an upper and a lower channel guide, a pair of cooperating slidable door sections in said guides, a vertically slidable window in each of said door sections; and a single vertically slidable window in the remaining side wall extended substantially the length thereof; said vertically slidable windows comprising each a pair of vertically disposed channel guides, a sash slidable therein; and said double window comprising a pair of double channeled guides on the front wall, a pair of overlapping window sections operable in said double channeled guides, the upper part of said side walls being secured to the underside of the existing canopy, and the lower part of said side walls being secured upon the existing fenders of the tractor.

In testimony whereof I affix my signature.

CHRISTOPHER C. FRAISE.